April 24, 1945.   E. L. COOK   2,374,176
PORTABLE POWER THREADER
Filed Oct. 23, 1943   2 Sheets-Sheet 1

INVENTOR.
ERVIN L. COOK.
BY
ATTORNEY.

April 24, 1945.　　　E. L. COOK　　　2,374,176
PORTABLE POWER THREADER
Filed Oct. 23, 1943　　　2 Sheets-Sheet 2
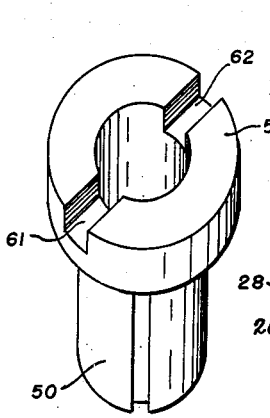
FIG. 5.
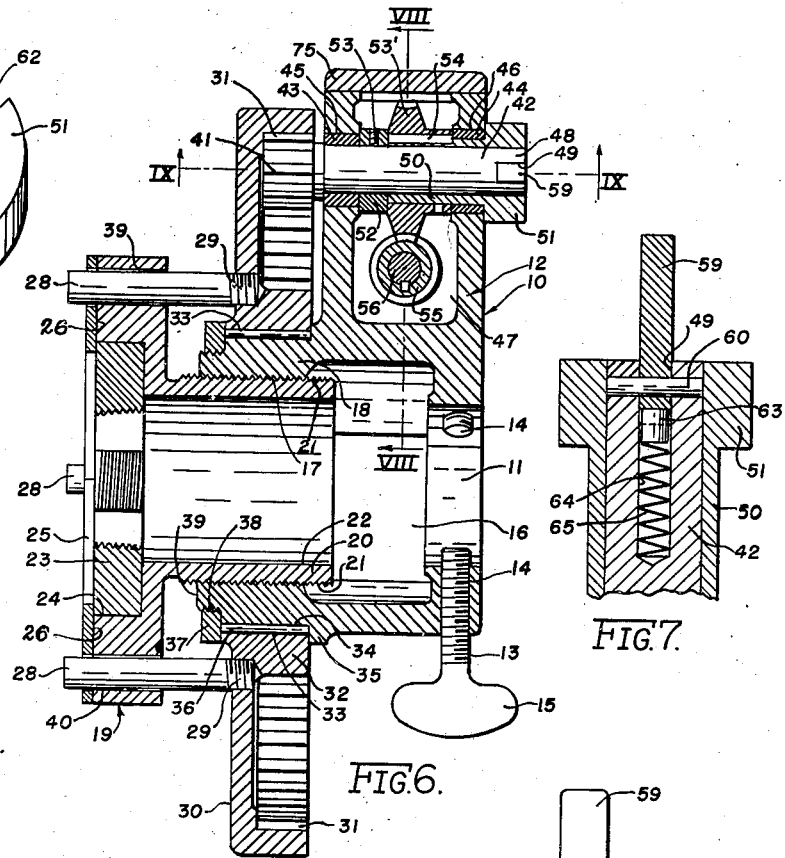
FIG. 6.
FIG. 7.
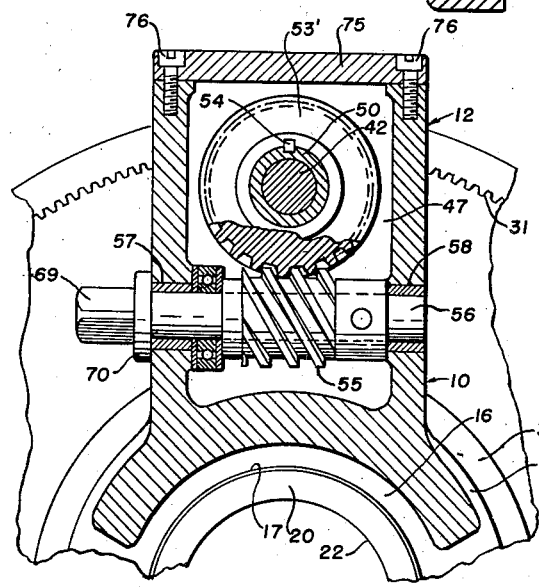
FIG. 8.
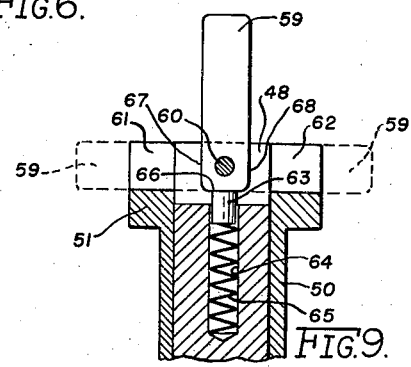
FIG. 9.
INVENTOR.
ERVIN L. COOK.
BY
ATTORNEY.

Patented Apr. 24, 1945

2,374,176

UNITED STATES PATENT OFFICE 2,374,176

PORTABLE POWER THREADER

Ervin L. Cook, Hammond, Ind.

Application October 23, 1943, Serial No. 507,436

18 Claims. (Cl. 10—89)

This invention relates to pipe threaders and more particularly to portable pipe threading devices, although certain features thereof may be employed with equal advantage for other purposes.

It contemplates more especially the provision of a simple, compact, light weight and highly portable power threader that is driven by any suitable source of power such as electric hand drills supplied with driver connecting sockets therefor.

Numerous types of power threaders of the stationary and portable type have heretofore been proposed, but these are complicated in construction, involve a comparatively large number of moving parts, burdensome in weight to the mechanic, and are expensive in construction.

It should be observed that the manual cutting of threads on pipes up to one inch in diameter presents no problem, but beyond this diameter it usually requires two men to cut threads on pipes up to about two inches in diameter, while pipes of still larger diameter usually must be threaded at the factory where heavy duty stationary pipe threaders are available.

The teaching of the present invention concerns itself with the problem of cutting threads on pipes between one and two inches in diameter that involve substantially eleven and one-half threads per inch as a standard. While pipes within this range can be manually threaded by two men in the field, yet the problem of man power limits the practicability of manually cutting threads on pipes within this range. Then, too, the labor expense involved is appreciable and for that reason portable power pipe threaders posses a distinct advantage and serve a highly useful purpose in the field for cutting threads on pipes up to two inches in diameter.

While specific pipe diameters have been referred to herein, these should be construed as illustrative rather than limitations upon the teachings of the invention which shall hereinafter be described in detail.

One object of the present invention is to simplify the construction and improve the operation of devices of the character mentioned.

Another object is to provide improved power pipe threading devices that are simple, compact, light weight and highly portable for use in the field.

Still another object is to provide a simple, inexpensive and light weight pipe threader that is power operated by portable electric tools of standard construction available for other purposes.

A further object is to provide a simple and inexpensive power pipe threader that embodies a simple power gear drive of the worm type to facilitate the use of a standard high speed power source such as an electric hand drill.

A still further object is to provide a portable power pipe threader embodying a simple, effective and inexpensive train of reduction gears having a driver worm and a driven spur gear with a simple intermedate gear arrangement.

Still a further object is to provide a portable pipe threader embodying a simple train of comparatively few gears arranged compactly to provide a driver worm and a driven internal spur gear with a simple train of intermeshing elements.

Other objects and advantages will appear from the following description of an illustrated embodiment of the present invention.

In the drawings:

Figure 4 is a perspective view of a power drive socket adapter for connection to an electric hand drill and the like for retention in the chuck of an electric hand drill and the like.

Figure 5 is a perspective view of the driven shank carrying the intermediate train of reduction gears with a clutching expedient provided thereon.

Figure 6 is an enlarged sectional view in elevation taken substantially along line VI—VI of Figure 3.

Figure 7 is a fragmentary section view of a clutching expedient taken substantially along line VII—VII of Figure 2.

Figure 8 is a fragmentary sectional view taken substantially along line VIII—VIII of Figure 6.

Figure 9 is a fragmentary sectional view taken substantially along line IX—IX of Figure 6.

Figure 1:
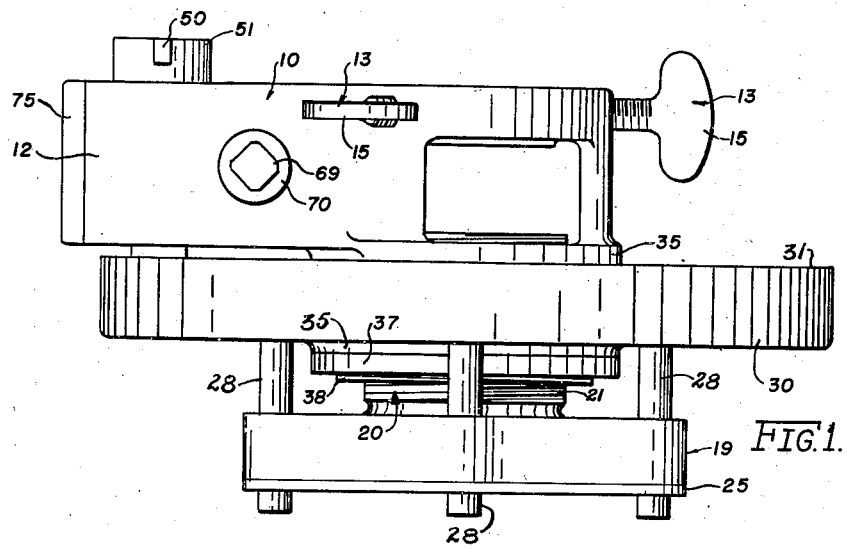
Figure 1 is an enlarged side plan view of a device embodying features of the present invention.
Figure 2:
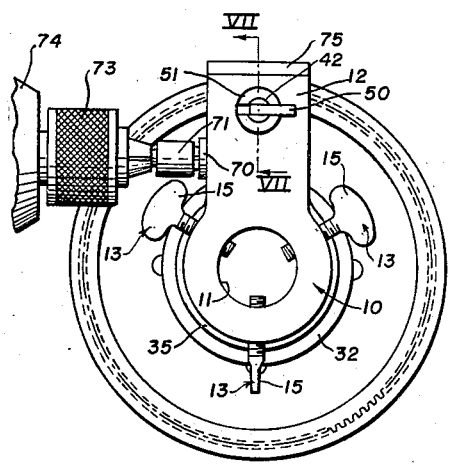
Figure 2 is a rear view (pipe inserting end) in elevation of the device shown in Figure 1 with a portable electric power source detachably connected therewith.

The structure selected for illustration is not intended to serve as a limitation upon the scope or teachings of the invention, but is merely illustrative thereof. There may be considerable variations and adaptations of all or part of the teachings depending upon the dictates of commercial practice.

The present embodiment comprises a substantially circular body 10 cast or otherwise shaped to provide an axial bore 11 somewhat larger than the maximum diameter of a pipe to be threaded in a manner to be hereinafter described. The circular body 10 extends upwardly to provide a substantially rectangular projecting portion 12 which serves as the reduction gear housing through which the die holder is power rotated as will appear more fully hereinafter.

In order to securely clamp a pipe in the bore 11, a plurality of studs 13, in this instance three, threadedly engage correspondingly threaded apertures 14 that extend radially through the circular portion of the body 10 to project within the bore 11 for engagement with the pipe extending therethrough. So that the pipe will be accurately centered and securely held within the bore 11, the threaded studs 13 are circumferentially and equidistantly spaced at one hundred and twenty degree angles.

So that the pipe can be manually clamped, the studs 13 are provided with finger manipulating wing heads 15 permitting the body 10 to serve as an effective clamping casing supported by the pipe to be threaded which, in turn, is held in a pipe vise. Pipe vises of this type are usually mounted on service trucks used by mechanics to carry their tools, equipment and supplies from place to place.

The pipe clamping bore 11 communicates with a somewhat enlarged chamber 16 in axial alignment therewith within the body 10 to merge in an internally threaded bore 17 provided in a collar portion 18 comprising an integral extension of the circular clamping casing portion of the body 10. The internal threads 17 of the collar 18 possess a pitch preferably corresponding with the pitch of the threads that are standard for pipes within the diameter range for which the clamping bore 11 is sized.

For instance, threads for pipes ranging between one and two inches in diameter customarily have eleven and one-half threads per inch so that the internal threaded bore 17 is correspondingly threaded to control the linear movement of the die holder 19 comprising, in this instance, a substantially rectangular shaped body (Figure 3) having a tubular cylindrical sleeve 20 formed integral therewith to extend axially inwardly to provide external threads 21 meshing with the internal threads 17 of the collar 18. This permits the threaded connection between the sleeve 20 of the die holder 19 and the corresponding internally threaded collar 18 of the pipe clamping casing portion of the body 10.

The die holder 19 is internally bored as at 22 to provide a diameter somewhat larger than the die clamping bore 11 to avoid any possible contact with the pipe extending therethrough to terminate proximate to a cutting die 23. The cutting die 23 is detachably associated with a correspondingly shaped recess 24 provided in the die holder 19 for linear and rotary movement therewith.

Figure 3:
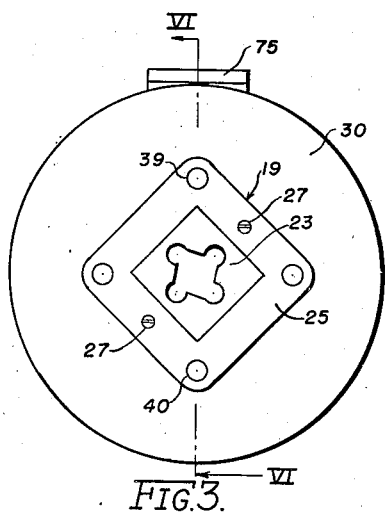
Figure 3 is a front view (cutting die end) in elevation of the device shown in Figure 2.
Figure 4:
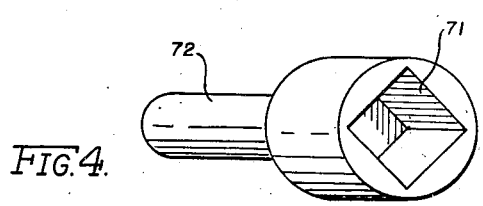

A retainer plate 25 complemental to the face 26 of the die holder 19, is detachably associated therewith through the medium of suitable fasteners 27 (Figure 3). The retainer plate 25 overlaps the die holder recess 24 and the body of the cutter die 23, to maintain their assembled association in axial alignment with the bore 22 of the die holder sleeve 20.

Rotation of the die holder 19 with the die 23 therein is effected through a plurality of pins 28, in this instance four, that are threadedly anchored as at 29 in the face or cover plate 30 of an internal annular spur gear 31 which has an enlarged hub 32 provided with an axial bore 33 of somewhat greater diameter than the confronting annular track 34 provided on the clamping casing collar 18. The annular track 34 on the collar 18 has a peripheral shoulder 35 which cooperates with the bore hub 32 of the internal annular gear 31 to serve as an inward stop therefor.

A roller bearing raceway 36 is interposed between the annular track 34 and the bore 33 of the internal annular spur gear 31 so that the latter will be journalled on the collar 18 for free rotation relative thereto. An internally threaded retainer ring 37 engages an externally threaded shoulder 38 provided on the free end 39 of the collar 18.

The externally threaded shoulder 38 is somewhat smaller in diameter than the annular track 34 which is adjacent thereto so that the retainer ring 37 will abut against the raceway 34 and the hub 32 to retain the internal annular spur gear in journalled association with the circular clamping casing portion of the body 10.

It should be noted that the pins 28 loosely project through somewhat larger aligned apertures 39—40 provided in the die holder 19 and its retainer face plate 25, thereby causing the thread cutting die 23 to rotate with the die holder 19 in unison with the internal annular spur gear 31. The annular spur gear 31 meshes with a pinion 41 fixed to the extremity of a stub shaft 42 journalled in aligned bearings 43—44 pressed or otherwise tightly fitted into aligned bores 45—46 provided in the confronting walls of the body extension 12 serving as a speed reduction gear housing. To this end, the gear housing 12 is internally chambered as at 47 to accommodate the speed reducing gears to be presently described.

The stub shaft 42 projects outwardly beyond the bearing 44 to present an external extension 48 which is provided with a diametrically extending slot 49 therethrough to constitute one element of a declutching expedient to be hereinafter described. As shown, the stub shaft 42 is journalled in a tubular sleeve 50 that, in turn, is journalled in the end bearing 44 and terminates beyond the gear housing 12 in an enlarged shoulder 51.

The sleeve 50 extends inwardly only to a spacer disk 52 that has a radially extending set screw 53 therein for engagement with the stub shaft 42. A worm wheel 53' is fixed to the sleeve 50 for rotation therewith relative to the stub shaft 42, there being a key 54 interposed between the sleeve 50 and worm wheel 53' to assure rotation of the worm wheel 53' with the sleeve 50 that normally is free to rotate on and relative to the stub shaft 42 constituting the driven shaft within the gear housing 12.

The worm wheel 53' meshes with a worm 55 that is keyed to a driving shaft 56 journalled in aligned bearings 57—58 provided in opposite confronting walls of the gear housing 12. It should be noted that the driver shaft 56 is disposed normal to the driven shaft 42, so that rotation imparted to the worm 55 will produce rotation of the worm wheel 53' which in turn, rotates the sleeve 50 that normally is journalled on the stub shaft 42 for relative rotation therewith.

So that the worm wheel sleeve 50 will rotate in unison with the stub or driven shaft 42 while threads are being cut on a pipe, a clutching element, in this instance a lever 59 is pivoted as at 60 within the stub shaft slot 49 to assume either a position in longitudinal alignment therewith or normal to the axis thereof when lodged in one or the other of two diametrically aligned slots 61—62 provided in the enlarged peripheral shoulder 51 of the worm wheel mounting sleeve 50 (see dotted lever position in Figure 9).

So that the clutching lever 59 may be maintained in operative or inoperative position with respect to the worm wheel sleeve 50, a spring impelled detent 63 is mounted in an axial bore 64 provided through one end of the stub shaft 42 (Figure 9) to communicate with the slot 48 therein.

A compression spring 65 is confined in the axial bore 64 of the stub shaft 42 to impel the detent 63 against the flat edge 66 of the lever 59 or either side edge 67 or 68 thereof so that the clutching lever 59 may assume its inoperative position in axial alignment with the stub shaft 42 (Figure 9) or a position normal thereto for lodgement in either bearing sleeve shoulder slot 61 or 62 (dotted outline in Figure 9), thereby causing the worm wheel bearing sleeve 50 to rotate in unison with the stub shaft 42 that is driven by the worm 55 through the medium of the worm wheel 53'.

Whenever it is desired to remove the thread cutting die 23 from the pipe that has been threaded therewith, the lever 59 is displaced to its axial aligned position relative to the stub or driven shaft 42, thereby permitting the manual reverse rotation of the spur gear 31 with the die holder 19. When the pipe threads are being cut with the die 23 traversing over the pipe clamped in the body 10, the clutching lever 59 is pivotally displaced for lodgement in either slot 61 or 62 of the worm wheel sleeve 50 to effect driving connection between the driven shaft 42 and the worm wheel sleeve 50 responsive to the rotation of the worm 55.

Rotation of the worm 55 with its driver shaft 56 is effected through the polygonal shank 69 comprising an external extension of the driver shaft 56 which has a peripheral shoulder 70 formed adjacent the external face of the gear housing 12 (Figure 8) to serve as a stop precluding inward axial displacement of the driver shaft 56 and to connect the polygonal external shank 69 therewith. Power is harnessed to the driver shank 56 by providing a socket 71 having a shank 72 for retention in the chuck 73 of a standard electric hand drill 74 that is usually available as a portable tool as service equipment.

The socket 71 is complemental to the polygonal shank 69 so that the standard electric drill motor 74 can be effectively used to rotate the worm 55 which, in turn, rotates the worm wheel 53' at an appreciably lower speed to correspondingly rotate the driven shaft 42 through the medium of the clutching lever 59.

Consequently, the pinion 41 is power turned to rotate the comparatively larger internal annular gear 31 that imparts very slow rotation to the die holder 19 and the thread cutting die 23 that moves in unison therewith for cutting threads on a pipe clamped between the threaded studs 13 in the bore 11 of the body 10. This effects the inward linear displacement of the die holder sleeve 20 which is threaded to correspond with the pitch of the threads provided on the cutter die 23 so that corresponding threads will be cut on the pipe.

After this has been accomplished, the electric hand drill 74 with its socket 71 is removed from the polygonal shank 69 of the driver shaft 56 to bring the thread cutting die 23 to a stop. Thereupon, the declutching lever 59 is displaced to its inoperative axially extending position (Figure 9) to permit the manual reverse rotation of the die holder 19 with its cutting die 23 until the latter is removed from the pipe.

This arrangement affords a very simple and effective two-speed power cutting and manual removing threader.

A top cover plate 75 is provided for the open end of the gear housing 12 (Figure 8), it being detachably connected therewith through the medium of suitable fasteners such as machine screws 76, thereby providing a hermetically sealed gear housing chamber 47 which can be filled with grease so that the worm wheel 53' and its meshing worm 55 mesh and function over an extended period of time with minimum friction and wear. It should be observed that the enclosed annular internal gear 31 shields or protects the hands of the attendant from injury and this serves as a safety feature.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a portable threading machine, the combination with a pipe clamping casing having a pipe receiving bore therein, a die holder threadedly connected to said pipe clamping casing, a gear fixed to said die holder to rotate therewith relative to said pipe clamping casing, a pinion fixed to a driven shaft in said casing to mesh with said gear, a driver shaft journalled in said casing, a power coupler on said driver shaft for detachable engagement of a rotary power source therewith, and reduction gearing in said casing between said driven and driver shafts.

2. In a portable threading machine, the combination with a pipe clamping casing having a pipe receiving bore therein, a die holder threadedly connected to said pipe clamping casing, a gear fixed to said die holder to rotate therewith relative to said pipe clamping casing, said gear being journalled for rotary support on said pipe clamping casing, a pinion fixed to a driven shaft in said casing to mesh with said gear, a driver shaft journalled in said casing, a power coupler on said driver shaft for detachable engagement of a rotary power source therewith, and reduction gearing in said casing between said driven and driver shafts.

3. In a portable threading machine, the combination with a pipe clamping casing having a pipe receiving bore therein, a die holder threadedly connected to said pipe clamping casing, a gear fixed to said die holder to rotate therewith relative to said pipe clamping casing, said gear being journalled for rotary support on said pipe clamping casing, roller bearings interposed between said gear and casing to insure free rotation therebetween, a pinion fixed to a driven shaft in said casing to mesh with said gear, a driver shaft journalled in said casing, a power coupler on said driver shaft for detachable engagement of a rotary power source therewith, and reduction gearing in said casing between said driven and driver shafts.

4. In a portable threading machine, the combination with a pipe clamping casing having a pipe receiving bore therein, a die holder threadedly connected to said pipe clamping casing, a gear fixed to said die holder to rotate therewith relative to said pipe clamping casing, a pinion fixed to a driven shaft in said casing to mesh with said gear, a driver shaft journalled in said casing, a power coupler on said driver shaft for detachable engagement of a rotary power source therewith, and reduction gearing comprising an inter-meshing worm and worm wheel in said casing between said driven and driver shafts.

5. In a portable threading machine, the combination with a pipe clamping casing having a pipe receiving bore therein, a die holder threadedly connected to said pipe clamping casing, a gear fixed to said die holder to rotate therewith relative to said pipe clamping casing, said gear being journalled for rotary support on said pipe clamping casing, a pinion fixed to a driven shaft in said casing to mesh with said gear, a driver shaft journalled in said casing, a power coupler on said driver shaft for detachable engagement of a rotary power source therewith, and reduction gearing comprising an inter-meshing worm and worm wheel in said casing between said driven and driver shafts.

6. In a portable threading machine, the combination with a pipe clamping casing having a pipe receiving bore therein, a die holder threadedly connected to said pipe clamping casing, a gear fixed to said die holder to rotate therewith relative to said pipe clamping casing, said gear being journalled for rotary support on said pipe clamping casing, roller bearings interposed between said gear and casing to insure free rotation therebetween, a pinion fixed to a driven shaft in said casing to mesh with said gear, a driver shaft journalled in said casing, a power coupler on said driver shaft for detachable engagement of a rotary power source therewith, and reduction gearing comprising an inter-meshing worm and worm wheel in said casing between said driven and driver shafts.

7. In a portable threading machine, the combination with a pipe clamping casing having a pipe receiving bore therein, a die holder threadedly connected to said pipe clamping casing, an internal annular gear fixed to said die holder to rotate therewith relative to said pipe clamping casing, a pinion fixed to a driven shaft in said casing to mesh with said gear, a driver shaft journalled in said casing, a power coupler on said driver shaft for detachable engagement of a rotary power source therewith, and reduction gearing comprising an inter-meshing worm and worm wheel in said casing between said driven and driver shafts.

8. In a portable threading machine, the combination with a pipe clamping casing having a pipe receiving bore therein, an axial collar on said casing to extend the length of said bore, a die holder threadedly connected to said pipe clamping casing, an internal annular gear fixed to said die holder to rotate therewith on said collar relative to said pipe clamping casing, a pinion fixed to a driven shaft in said casing to mesh with said gear, a driver shaft journalled in said casing, a power coupler on said driver shaft for detachable engagement of a rotary power source therewith, and reduction gearing comprising an inter-meshing worm and worm wheel in said casing between said driven and driver shafts.

9. In a portable threading machine, the combination with a pipe clamping casing having a pipe receiving bore therein, an axial collar on said casing to extend the length of said bore, a die holder threadedly connected to the collar of said pipe clamping casing, an internal annular gear fixed to said die holder to rotate therewith on said collar relative to said pipe clamping casing, roller bearings interposed between said gear and casing collar to insure free rotation therebetween, a pinion fixed to a driven shaft in said casing to mesh with said gear, a driver shaft journalled in said casing, a power coupler on said driver shaft for detachable engagement of a rotary power source therewith, and reduction gearing comprising an inter-meshing worm and worm wheel in said casing between said driven and driver shafts.

10. In a portable threading machine for support in a vise or the like, the combination with a pipe clamping casing having a pipe receiving bore therein extending through an axially projecting hub, a driver shaft journalled in said casing, a driven shaft journalled in said casing, reduction gearing in said casing interposed between said driven and driver shafts, a polygonal shank on said driver shaft, said polygonal shank projecting externally of said casing for registry by a complemental socket carried by a rotary power source, a pinion on said driven shaft, said pinion being externally of said casing, a gear journalled for rotation on said casing hub in axial alignment with said pipe receiving bore for meshing engagement with said pinion, a thread cutting die holder mounted for rotation with said gear, a hub sleeve on said holder in axial alignment with said pipe receiving casing hub bore, complemental threads between said sleeve and casing hubs to establish their threaded rotary connection corresponding with the pitch of the threads to be cut with said die holder, and thread cutting dies in said die holder to exteriorly engage a pipe held in said clamping casing.

11. In a portable threading machine for support in a vise or the like, the combination with a pipe clamping casing having a pipe receiving bore therein extending through an axially projecting hub, a driver shaft journalled in said casing, a driven shaft journalled in said casing, reduction gearing in said casing interposed between said driven and driver shafts, a polygonal shank on said driver shaft, said polygonal shank projecting externally of said casing for registry by a complemental socket carried by a rotary power source, a pinion on said driven shaft, said pinion being externally of said casing, an internal gear having a solid face plate journalled for rotation on said casing hub in axial alignment with said pipe receiving bore for meshing engagement with said pinion, a thread cutting die holder mounted for rotation with said gear, a hub sleeve on said holder in axial alignment with said pipe receiving casing hub bore, complemental threads between said sleeve and casing hubs to establish their threaded rotary connection corresponding with the pitch of the threads to be cut with said die holder, and thread cutting dies in said die holder to exteriorly engage a pipe held in said clamping casing.

12. In a portable threading machine for support in a vise or the like, the combination with a pipe clamping casing having a pipe receiving bore therein extending through an axially projecting hub, a driver shaft journalled in said casing, a driven shaft journalled in said casing, reduction gearing in said casing interposed between said driven and driver shafts, a polygonal shank on said driver shaft, said polygonal shank projecting externally of said casing for registry by a complemental socket carried by a rotary power source, a pinion on said driven shaft, said pinion being externally of said casing, a gear journalled for rotation on said casing hub in axial alignment with said pipe receiving bore for meshing engagement with said pinion, roller bearings interposed between said gear and hub to insure free rotation therebetween, a thread cutting die holder mounted for rotation with said gear, a hub sleeve on said holder in axial alignment with said pipe receiving casing hub bore, complemental threads between said sleeve and casing hubs to establish their threaded rotary connection corresponding with the pitch of the threads to be cut with said die holder, and thread cutting dies in said die holder to exteriorly engage a pipe held in said clamping casing.

13. In a portable threading machine for support in a vise or the like, the combination with a pipe clamping casing having a pipe receiving bore therein extending through an axially projecting hub, a driver shaft journalled in said casing, a driven shaft journalled in said casing, reduction gearing in said casing interposed between said driven and driver shafts, a polygonal shank on said driver shaft, said polygonal shank projecting externally of said casing for registry by a complemental socket carried by a rotary power source, a pinion on said driven shaft, said pinion being externally of said casing, an internal gear having a solid face plate journalled for rotation on said casing hub in axial alignment with said pipe receiving bore for meshing engagement with said pinion, roller bearings interposed between said gear and hub to insure free rotation therebetween, a thread cutting die holder mounted for rotation with said gear, a hub sleeve on said holder in axial alignment with said pipe receiving casing hub bore, complemental threads between said sleeve and casing hubs to establish their threaded rotary connection corresponding with the pitch of the threads to be cut with said die holder, and thread cutting dies in said die holder to exteriorly engage a pipe held in said clamping casing.

14. In a portable threading machine for support in a vise or the like, the combination with a pipe clamping casing having a pipe receiving bore therein extending through an axially projecting hub, a driver shaft journalled in said casing, a driven shaft journalled in said casing, reduction gearing in said casing interposed between said driven and driver shafts, a polygonal shank on said driver shaft, said polygonal shank projecting externally of said casing for registry by a complemental socket carried by a rotary power source, a pinion on said driven shaft, said pinion being externally of said casing, a gear journalled for rotation on said casing hub in axial alignment with said pipe receiving bore for meshing engagement with said pinion, a thread cutting die holder mounted for rotation with said gear, driving pins extending between said gear and die holder to permit their relative axial displacement while insuring their rotation in unison, a hub sleeve on said holder in axial alignment with said pipe receiving casing hub bore, complemental threads between said sleeve and casing hubs to establish their threaded rotary connection corresponding with the pitch of the threads to be cut with said die holder, and thread cutting dies in said die holder to exteriorly engage a pipe held in said clamping casing.

15. In a portable threading machine, the combination with a pipe clamping casing having a pipe receiving bore therein, a die holder threadedly connected to said pipe clamping casing, a gear fixed to said die holder to rotate therewith relative to said pipe clamping casing, a pinion fixed to a driven shaft in said casing to mesh with said gear, a tubular sleeve shaft rotatively mounted on said driven shaft, a driver shaft journalled in said casing, a power coupler on said driver shaft for detachable engagment of a rotary power source therewith, reduction gearing in said casing between said driven tubular sleeve shaft and driver shafts, and clutching means for connecting and disconnecting said driven and tubular sleeve shafts to effect their simultaneous or relative rotation.

16. In a portable threading machine, the combination with a pipe clamping casing having a pipe receiving bore therein, a die holder threadedly connected to said pipe clamping casing, a gear fixed to said die holder to rotate therewith relative to said pipe clamping casing, a pinion fixed to a driven shaft in said casing to mesh with said gear, a tubular sleeve shaft rotatively mounted on said driven shaft, a driver shaft journalled in said casing, a power coupler on said driver shaft for detachable engagement of a rotary power source therewith, reduction gearing in said casing between said driven tubular sleeve shaft and driver shafts, and clutching means comprising complemental elements on said driven and tubular sleeve shafts for connecting and disconnecting said driven and tubular sleeve shafts to effect their simultaneous or relative rotation.

17. In a portable threading machine, the combination with a pipe clamping casing having a pipe receiving bore therein, a die holder threadedly connected to said pipe clamping casing, a gear fixed to said die holder to rotate therewith relative to said pipe clamping casing, a pinion fixed to a driven shaft in said casing to mesh with said gear, a tubular sleeve shaft rotatively mounted on said driven shaft, a driver shaft journalled in said casing, a power coupler on said driver shaft for detachable engagement of a rotary power source therewith, reduction gearing in said casing between said driven tubular sleeve shaft and driver shafts, and clutch means comprising a pivotal lever and complemental groove therefor on adjacent portions of said driven and tubular sleeve shafts for connecting and disconnecting said driven and tubular sleeve shafts to effect their simultaneous or relative rotation.

18. In a portable threading machine, the combination with a pipe clamping casing having a pipe receiving bore therein, a die holder threadedly connected to said pipe clamping casing, a gear fixed to said die holder to rotate therewith relative to said pipe clamping casing, a pinion fixed to a driven shaft in said casing to mesh with said gear, a tubular sleeve shaft rotatively mounted on said driven shaft, a driver shaft journalled in said casing, a power coupler on said driver shaft for detachable engagement of a rotary power source therewith, reduction gearing in said casing between said driven tubular sleeve shaft and driver shafts, clutching means comprising a pivotal lever and complemental groove therefor on adjacent portions of said driven and tubular sleeve shafts for connecting and disconnecting said driven and tubular sleeve shafts to effect their simultaneous or relative rotation, and means cooperating with said pivotal lever for maintaining it in its predetermined adjusted positions of connecting or disconnecting said driven and tubular sleeve shafts.

ERVIN L. COOK.